United States Patent
Zhao

(10) Patent No.: US 8,180,915 B2
(45) Date of Patent: May 15, 2012

(54) CODING DATA STREAMS

(75) Inventor: David Zhao, Solna (SE)

(73) Assignee: Skype Limited, Dublin (IE)

( * ) Notice: Subject to any disclaimer, the term of this patent is extended or adjusted under 35 U.S.C. 154(b) by 0 days.

(21) Appl. No.: 12/657,973

(22) Filed: Jan. 29, 2010

(65) Prior Publication Data

US 2011/0153782 A1    Jun. 23, 2011

(30) Foreign Application Priority Data

Dec. 17, 2009   (GB) .................................. 0922057.5

(51) Int. Cl.
*G06F 15/16*   (2006.01)
*H04N 7/173*   (2011.01)
*H04N 7/12*    (2006.01)

(52) U.S. Cl. ........ 709/231; 709/219; 709/232; 709/234; 709/246; 725/109; 375/240.12

(58) Field of Classification Search .......... 709/219, 709/231, 236, 234, 246, 232; 725/109; 375/240.12
See application file for complete search history.

(56) References Cited

U.S. PATENT DOCUMENTS

| | | | |
|---|---|---|---|
| 5,875,304 A * | 2/1999 | Winter et al. ................. | 709/231 |
| 6,907,073 B2 * | 6/2005 | Sawhney et al. ......... | 375/240.14 |
| 7,356,587 B2 * | 4/2008 | Boulanger et al. ........... | 709/224 |
| 7,974,341 B2 | 7/2011 | Chen et al. | |
| 2002/0071027 A1 | 6/2002 | Sugiyama et al. | |
| 2002/0071485 A1 | 6/2002 | Caglar et al. | |
| 2004/0008780 A1 | 1/2004 | Lai et al. | |
| 2005/0249285 A1 | 11/2005 | Chen et al. | |
| 2006/0146934 A1 | 7/2006 | Caglar et al. | |
| 2006/0224760 A1 * | 10/2006 | Yu et al. ........................ | 709/231 |
| 2009/0327918 A1 * | 12/2009 | Aaron et al. .................. | 715/751 |
| 2010/0226436 A1 | 9/2010 | Dane et al. | |
| 2011/0058607 A1 | 3/2011 | Zhao | |

FOREIGN PATENT DOCUMENTS

JP    2003143180 A    5/2003

(Continued)

OTHER PUBLICATIONS

Wiegand, T., et al., "Overview of the H.264/AVC Video Coding Standard," IEEE Transactions on Circuits and Systems for Video Technology, vol. 13, Issue 7, pp. 560-576, Jul. 2003.

(Continued)

*Primary Examiner* — Asghar Bilgrami
(74) *Attorney, Agent, or Firm* — Hamilton, Brook, Smith & Reynolds, P.C.

(57) ABSTRACT

A method of delivering an encoded data stream to a plurality of recipient end-user nodes of a network includes receiving an incoming encoded data stream at a first recipient node from a transmitting node over the network. During ongoing receipt of the incoming encoded data stream at the first recipient node from the transmitting node, the incoming encoded data stream is decoded at the first recipient node to produce a decoded data stream that is output for consumption at the first recipient node. The decoded data stream is used to generate a modified encoded data stream being a modified version of the incoming encoded data stream. Still during ongoing receipt of the incoming encoded data stream at the first recipient node from the transmitting node, the modified encoded data stream is relayed from the first recipient node to one or more second recipient nodes over the network.

28 Claims, 9 Drawing Sheets

FOREIGN PATENT DOCUMENTS

| | | |
|---|---|---|
| WO | WO 00/38330 A1 | 6/2000 |
| WO | WO 03/084244 A1 | 10/2003 |
| WO | WO 2004/110018 A1 | 12/2004 |
| WO | WO 2005/009019 | 1/2005 |
| WO | WO 2005/009019 A2 | 1/2005 |

OTHER PUBLICATIONS

Fan, X., et al., "Transcoding Based Robust Streaming of Compressed Video," IEEE, International Conference on Acoustics, Speech and Signal Processing, pp. 909-912, Apr. 19-24, 2009.

Search Report for GB0922057.5, date of search: Apr. 15, 2011 (1 page).

Notification of Transmittal of The International Search Report and The Written Opinion of the International Searching Authority, or the Declaration for PCT/EP2010/069899, date of mailing: Mar. 21, 2011 (12 pages).

Hossain, et al., "Minimizing Rate Distortion in Peer-to-Peer Networking," IEEE, pp. 1-5 (2009).

Akabri, et al., "Packet Loss Recovery Schemes for Peer-to-Peer Video Streaming," Network and Services, IEEE, p. 94 (2007).

Noh, et al., "Stanford Peer-to-Peer Multicast (SPPM)—Overview and Recent Extensions," IEEE, pp. 1-4 (2009).

Jinfeng, et al., "Adaptive Video Streaming over P2P Multi-Hop Path," Advanced Information Networking and Applications Workshops, IEEE, pp. 160-165 (2007).

Kho, et al. "Skype Relay Calls: Measurements and Experiments," Computer Communications Workshops IEEE, pp. 1-6 (2008).

PCT Notification of Transmittal of the International Search Report and the Written Opinion of the International Searching Authority, or the Declaration, PCT/EP2010/063193, Date of Mailing: Oct. 29, 2010, 19 pp.

Farber, N., et al., "Robust H.263 Compatible Transmission for Mobile Video Server Access," *Wireless Image/Video Communications 1996*, First International workshop on Loughborough, UK, Sep. 4-5, 1996, New York, NY, USA, IEEE, US NNKD-DOI: 10.1109/WIVC.1996.624635, pp. 8-13 (Sep. 4, 1996).

Farber, N., et al., "Robust H.263 Compatible Video Transmission for Mobile Access to Video Servers," *International Workshop on Wireless Image/Video Communications*, XX, XX, vol. 2, pp. 73-76 (Jan. 1, 1997).

"Digital Enhanced Cordless Telecommunications (DECT); New Generation DECT; Overview and Requirements; ETSI TR 102 570," *ETSI Standards*, LIS, Sophia Antipolis Cedex, France, vol. DECT, No. V1.1.1, pp. 1-17, (Mar. 1, 2007).

Karczewicz, M. And Kureeren, R., "The SP- and SI-Frames Design for H.264/AVC," *IEEE Transactions on Circuits and Systems for Video Technology*, vol. 13, No. 7, pp. 637-644, (Jul. 2003).

Fan, X., et al., "Transcoding Based Robust Streaming of Compressed Video," *IEEE*, International Conference on Acoustics, Speech and Signal Processing (ICASSP) 2009, pp. 909-912 (Apr. 19-24, 2009).

Wiegand, T., Sullivan, G. J., Bjontegaard, G., and Luthra, A., "Overview of the H.264/AVC Video Coding Standard," *IEEE Transactions on Circuits and Systems for Video Technology*, vol. 13, Issue 7, pp. 560-576 (Jul. 2003).

\* cited by examiner

CODING DATA STREAMS

RELATED APPLICATION

This application claims priority under 35 U.S.C. §119 or 365 to Great Britain, Application No. 0922057.5, filed Dec. 17, 2009. The entire teachings of the above application are incorporated herein by reference.

TECHNICAL FIELD

The present invention relates to encoding of data for transmission to multiple recipients.

BACKGROUND

As will be familiar to a person skilled in the art, various techniques exist for encoding video and/or audio streams for transmission over a network.

For instance, video coding commonly uses two types of video frames: intra-frames and inter-frames. An intra-frame is compressed using only the current video frame, i.e. intra-frame prediction, similarly to static image coding. An inter-frame on the other hand is compressed using the knowledge of one of the previously decoded frames, and allows for much more efficient compression when there are relatively few changes over time in the scene being encoded. Inter-frame coding is particularly efficient for, e.g., a talking-head with static background, typical in video conferencing. Depending on the resolution, frame-rate, bit-rate and scene, an intra-frame can require up to 20-100 times more data than an inter-frame. On the other hand, an inter-frame imposes a dependency relation to previous inter-frames up to the most recent intra-frame. If any of those frames are missing, decoding the current inter-frame may result in errors and artifacts.

These ideas are used for example in the H.264/AVC standard (see T. Wiegand, G. J. Sullivan, G. Bjontegaard, A. Luthra: "Overview of the H.264/AVC video coding standard," in IEEE Transactions on Circuits and Systems for Video Technology, Volume: 13, Issue: 7, page(s): 560-576, July 2003).

Frequent and periodic transmission of intra-frames is common in video streaming. These periodically transmitted intra-frames are sometimes referred to as "key-frames". The idea is illustrated schematically in FIG. 1, where key frames 1, 5, 9 and 13 etc. (shown black) are interleaved periodically between the transmission of inter-frames 2-4, 6-8, 10-12 and 14-16 etc. (shown white). The key frames are needed for two main reasons. Firstly, when a new user joins the session, he/she can only start decoding the video when a key-frame is received. Secondly, on packet loss, particularly bursty packet loss, the key-frame is a way to recover the lost coding state for proper decoding. The key frames allow the receiver to periodically update with "absolute" data, not relying on encoding relatively to previous frames, thus avoiding errors that could otherwise propagate due to packet loss. However, the larger sizes of key frames also incur a larger bandwidth for transmission.

Therefore conventionally it is necessary to try balance the bandwidth cost of transmitting intra-frames too frequently against the effect of packet-loss which may be caused by transmitting too few intra-frames. This may be a particular problem where the stream is intended for two or more recipients. Referring to FIGS. 5 and 7a, suppose for the sake of example that a transmitting node 102(X) is to transmit a video stream to two recipient nodes 102(Y) and 102(Z) over a packet based network 108 such as the Internet. These three nodes may be referred to as nodes X, Y and Z for brevity. Each of the recipients Y and Z will set up a respective one-to-one connection with the transmitting node X over the network 108, and X will encode the video stream for transmission over each of those connections. However, it may be that the connection (or channel) from X to Z can support a higher bandwidth than the connection from X to Y, or experiences a worse rate of packet loss. In that case a stream comprising a higher rate of intra-frames (and therefore a higher coding rate incurring a higher bandwidth) would be more appropriate for transmission to Z, but a stream comprising a lower rate of intra-frames would be more appropriate for transmission to Y. Because they are less efficiently encoded and so require more data, it would be desirable to avoid unnecessary transmission of intra-frames. The transmitting node X could generate two different versions of the streams, but that may incur an unnecessary processing cost at the transmitter X.

A similar problem may occur more generally for example if the transmitting node X has a choice of different available codecs or coding options for encoding an audio or video stream. One codec may result in a higher bitrate encoded stream (i.e. higher coding rate) which would be more suitable for transmission over the connection from X to Z, whereas another codec may result in a lower bitrate encoded stream and therefore be more suitable for transmission over the connection from X to Y. In such a situation, it may conventionally be necessary to transmit using a codec that is not optimal for one of the two connections, or perhaps a third codec which is a compromise between the two. The transmitting node could alternatively encode two versions of the stream with different coding rates, but that would be wasteful of processing resources at the transmitting node X.

It would be desirable to try to mitigate these problems to some extent.

SUMMARY

The present invention uses one of the recipient nodes to relay the stream to another recipient node. The invention then takes advantage of the fact that the first recipient node—because it is a consumer as well as a relay of the stream—is aware of the decoded content of the stream and is therefore able to use that knowledge to generate a modified version of the encoded stream for relaying to the second recipient node. This means that different versions of the stream can be delivered to each of the two different recipient nodes (which may experience different channel conditions over the network), but without requiring the transmitting node to expend unnecessary processing resources encoding two different versions of the stream.

Therefore according to one aspect of the present invention, there is provided a method of delivering an encoded data stream to a plurality of recipient end-user nodes of a network, the method comprising: receiving an incoming encoded data stream at a first recipient node from a transmitting node over the network; during ongoing receipt of the incoming encoded data stream at the first recipient node from the transmitting node, decoding the incoming encoded data stream at the first recipient node to produce a decoded data stream and outputting the decoded data stream for consumption at the first recipient node; at the first recipient node, using the decoded data stream to generate a modified encoded data stream being a modified version of the incoming encoded data stream; and still during ongoing receipt of the incoming encoded data stream at the first recipient node from the transmitting node, relaying the modified encoded data stream from the first recipient node to one or more second recipient nodes over the network.

In embodiments, the incoming encoded data stream may comprise an encoded video stream, and said output of the stream for consumption may comprise playing the video stream at the first recipient node.

Preferably the modification performed at the first recipient node may comprise generating and inserting additional encoded data into the relayed stream based on the decoded stream, such as additional intra-frames in the case of video.

Therefore in preferred embodiments, the modified encoded data stream may be generated at the first recipient node by generating additional encoded data based on the decoded data stream and associating the additional encoded data with encoded data of the incoming encoded data stream, the additional encoded data not having been included in encoded form in the incoming encoded data stream as received at the first recipient node from the transmitting node.

The incoming encoded data stream may comprise a stream of inter frame encoded video data, and the additional encoded data may comprises intra frame encoded video data.

Alternatively however, the modification could comprise re-encoding the decoded stream according to a different codec.

In particularly preferred embodiments of the present invention, the additional encoded data such as the additional intra frames are transmitted "on demand". This means for example that intra frame data need not necessarily be transmitted with any particular predetermined or autonomously determined regularity from the first recipient node, but rather as and when required by the second recipient. This allows a reduction in the amount of intra frame data that needs to be relayed, resulting in better compression and therefore incurring less bandwidth.

Therefore in preferred embodiments, the method may comprise: relaying an un-modified encoded data stream, being an un-modified version of the incoming encoded data stream, from the first recipient node to the second recipient node over the network; and receiving a request signal at the first recipient node from the second recipient node; wherein said relaying of the modified encoded data stream is performed in response to the request signal from the second recipient node.

In fact, preferably no periodic transmission of intra frame data is required at all, nor any autonomous transmission of intra frame data from the first recipient node.

Therefore preferably, said relaying of the modified encoded data stream to each of the one or more second recipient nodes may be performed only in response to the respective request signal. Further, in the case of a stream of inter frame encoded video data, this may be relayed to the second recipient node without periodic inclusion of intra frame encoded video data in the modified encoded data stream.

Further, the request from the second recipient preferably signals loss of one or more specific packets (rather than indicating a general loss rate), and the first recipient selects which additional encoded data is to be provided in response to that request, specifically to compensate for the lost packet or packets. For example, the second recipient may request a specific intra frame to compensate the loss of a specific packet or packets.

Therefore in embodiments, the request signal may indicate that the respective second recipient node has failed to receive a portion of the un-modified encoded data stream.

The modified encoded data stream may have a higher coding rate than the incoming encoded data stream. Thus the transmitting node only incurs the processing burden of encoding the lower rate stream, and the channel from the transmitter to the first recipient (which may for example experience less packet loss) only incurs the lower rate bandwidth. However, at the same time, the knowledge of the decoded stream at the first recipient node can be used to generate a higher rate stream for relaying over the channel to the second recipient node (which may for example experience more packet loss).

Furthermore, the present invention is particularly advantageous in the case of multi-recipient video relayed to a plurality of second recipients, where excessive transmission of high coding-rate data such as intra frames to multiple parties would place a particularly high bandwidth burden on the transmission medium.

Thus in embodiments, said relaying of the modified encoded data stream may comprise relaying the modified encoded data stream from the first recipient node to a plurality of second recipient nodes over the network.

Said relaying of the un-modified encoded data stream may comprise relaying the un-modified encoded data stream from the first recipient node to a plurality of second recipient nodes over the network; the method may comprise receiving a respective request signal at the first recipient node from each of said second recipient nodes; and said relaying of the modified encoded data stream to each of the plurality of second recipient nodes may be performed in response to the respective request signal from each of those second recipient node.

In further embodiments, the network may be a packet-based communication network. The packet-based communication network may comprise the internet.

The transmitting node may be an end-user node. The method may comprise establishing a connection between the transmitting node and the first recipient node over said network using a peer-to-peer communication system, wherein the encoded data stream may be transmitted to the intermediate node over said peer-to-peer established connection.

Further, the method may comprise establishing a connection between the first recipient node and the second recipient node over said packet-based communication network using a peer-to-peer communication system, wherein the modified version of the encoded data stream may be transmitted from the first recipient node over said peer-to-peer established connection.

According to another aspect of the present invention, there is provided a client application comprising code embodied on a computer-readable medium and being configured so as when executed on a first recipient end-user node: to receive an incoming encoded data stream at the first recipient node from a transmitting node over a network; during ongoing receipt of the incoming encoded data stream at the first recipient node from the transmitting node, to decode the incoming encoded data stream at the first recipient node to produce a decoded data stream and to output the decoded data stream for consumption at the first recipient node; to use the decoded data stream to generate a modified encoded data stream being a modified version of the incoming encoded data stream; and still during ongoing receipt of the incoming encoded data stream at the first recipient node from the transmitting node, to relay the modified encoded data stream from the first recipient node to one or more second recipient nodes over the network.

According to another aspect of the present invention, there may be provided a first recipient end-user node comprising: a receiver arranged to receive an incoming encoded data stream at the first recipient node from a transmitting node over a network; processing apparatus configured, during ongoing receipt of the incoming encoded data stream at the first recipient node from the transmitting node, to decode the incoming encoded data stream at the first recipient node to produce a decoded data stream, to output the decoded data stream for consumption at the first recipient node, and to use the decoded data stream to generate a modified encoded data stream being a modified version of the incoming encoded data stream; and a transmitter arranged, still during ongoing receipt of the incoming encoded data stream at the first recipient node from the transmitting node, to relay the modified encoded data stream from the first recipient node to one or more second recipient nodes over the network.

In embodiments, the client application or transmitter may be further configured in accordance with any of the above method features.

BRIEF DESCRIPTION OF THE DRAWINGS

For a better understanding of the present invention and to show how it may be carried into effect, reference will now be made by way of example to the accompanying drawings in which.

DETAILED DESCRIPTION

In preferred embodiments, the present invention is applied to cross-layer optimization for multimedia stream delivery over a peer-to-peer (P2P) communication system. In this case, the idea is to make the routing peer in between nodes more intelligent, so that the content of the stream can be modified in the network in a distributed manner.

Figure 5:
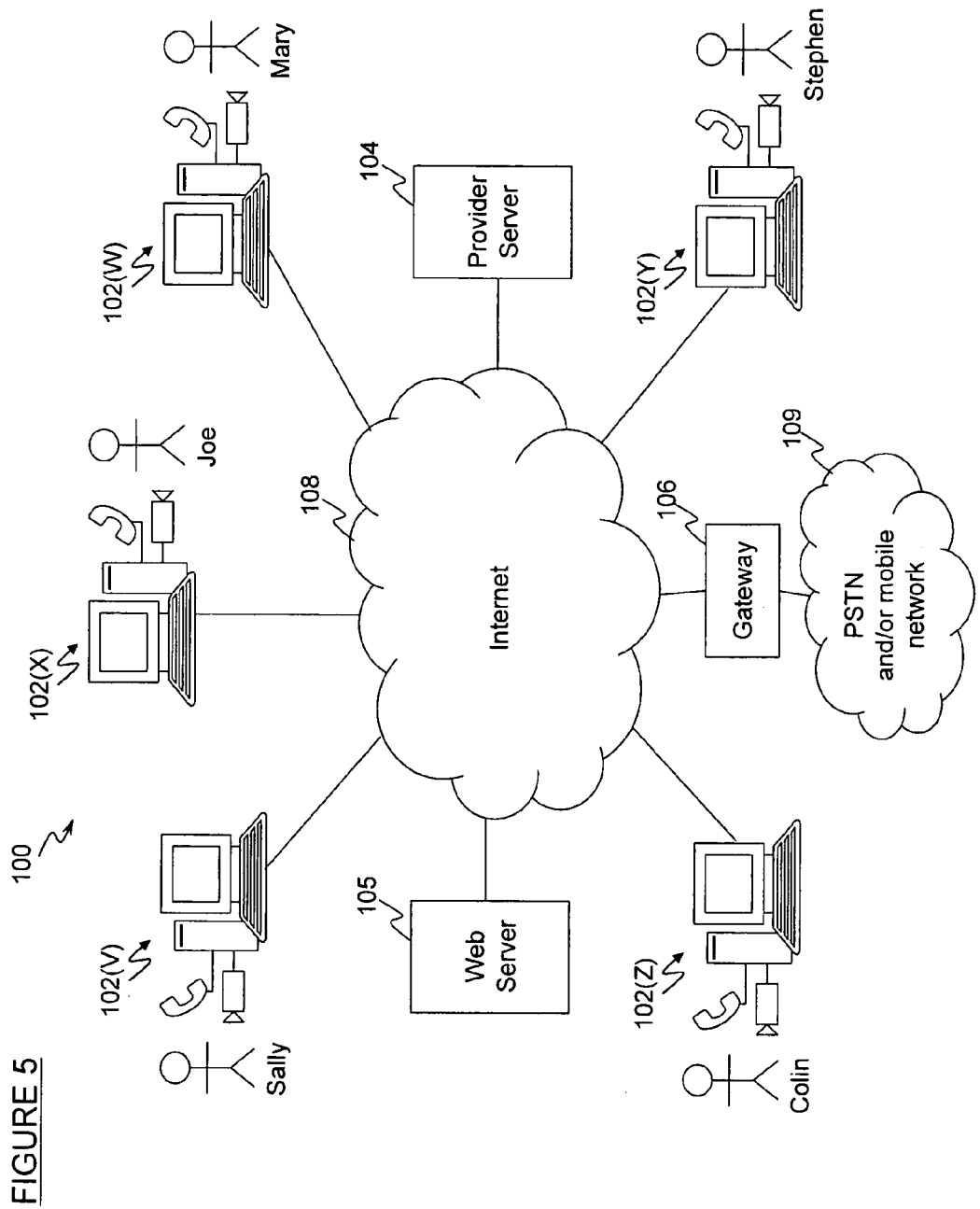
FIG. 5 is a schematic representation of a packet-based network such as the Internet.
Figure 7A:
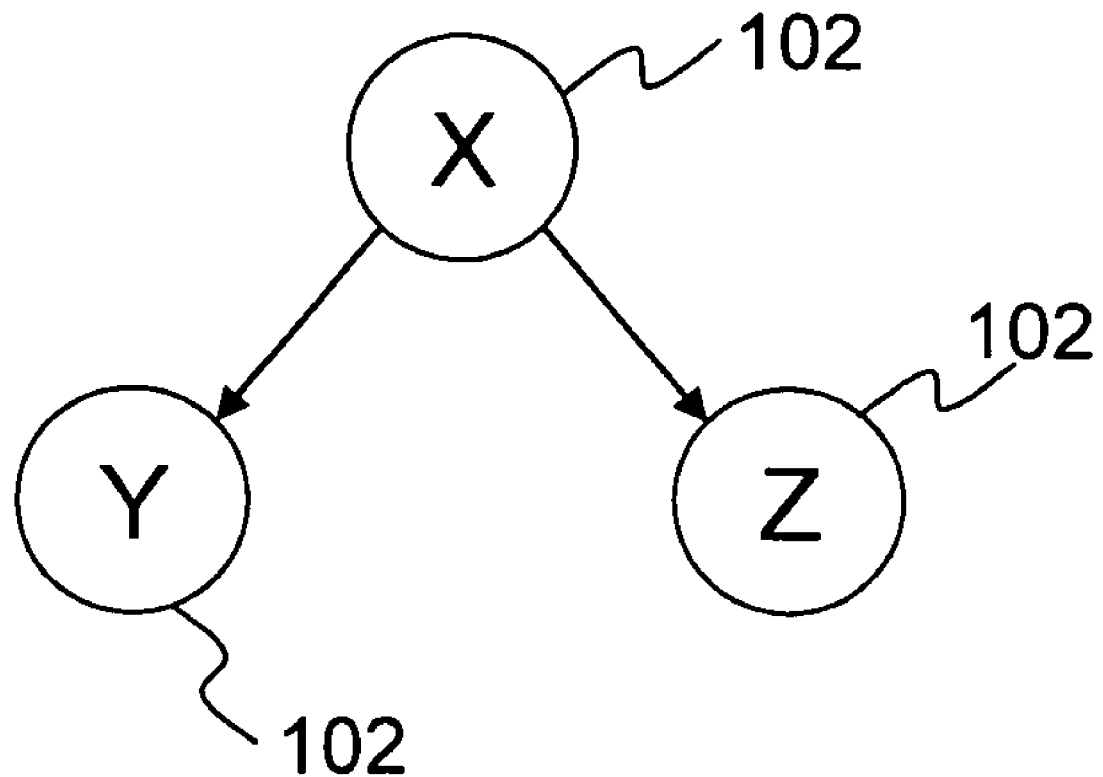
FIGS. 7a-7d schematically illustrate examples for routing a video stream between nodes of a communication system.
Figure 7B:
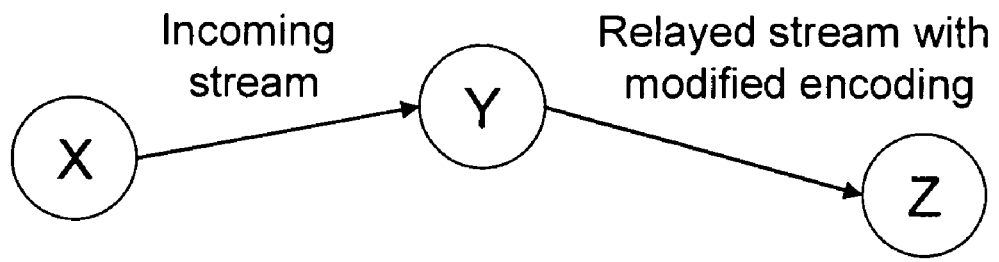

Referring to FIGS. 5 and 7b, consider a case where a first recipient node 102(Y) establishes a connection with a transmitting node 102(X) (the provider) and begins receiving a video stream over that connection, and then subsequently a second recipient node 102(Z) is to join the stream. For example, the purpose could be a live video conference or phone conference. The nodes may be referred to herein as X, Y and Z for brevity. Each node is preferably an end-user node such as a desktop or laptop PC or internet-enabled mobile phone, e.g. being peers of a P2P system.

Instead of simply establishing another one-to-one connection between the transmitting node X and the new recipient Z, according to the present invention the new recipient Z may establish a one-to-one connection with the first recipient node Y. The first recipient Y will then act as a relay of the stream, relaying it to the second recipient Z. This reduces the uplink bandwidth burden on the transmitting node X. The video or audio stream is live, transmitted in real time and decoded in real time at least at the first recipient and preferably also the second recipient Z, e.g. in the case of a video conference.

Furthermore, according to the present invention, the first recipient may not only relay the stream, but may also modify its encoding before forwarding it onwards to the second recipient. This is possible because of the fact that first, intermediate recipient is not just a non-participating relay, but is itself also a consumer of the stream (as is the second recipient Z). That is to say, the incoming stream from the transmitter X is decoded at the first recipient Y for output to the user of terminal Y for consumption, e.g. by actually decoding and playing the video to the user in the case of a video stream. The invention takes advantage of the fact that the incoming stream is already being decoded at the first, intermediate recipient node Y for that purpose, in order to additionally use that decoded stream for another purpose, to generate a modified version of the encoded stream at the first recipient Y for relaying onwards to the second recipient Z.

In preferred embodiments, in the case of a video stream, the modification comprises generating additional intra frames at the first recipient node Y based on the decoded stream as decoded at Y, and sending these additional intra frames along with the already-encoded data being relayed from the transmitting node X. Preferably, the intra frames are sent to the second recipient Y "on demand", i.e. in response to a request signal fed back from the second recipient Z to the first recipient Y. In this context, the additional intra frames may be referred to herein as "sync-frames", which will be discussed in more detail shortly. Preferably the signal fed back from the second recipient Z is in response to loss of a specific packet or packets (rather than being a general indication of a loss rate), and the sync-frames are provided by the first recipient in order to compensate for the specifically identified packet loss.

Modifying the media content on routing peers allows certain use cases to be handled. One such case is when a new receiver joins the stream.

Without using the present invention, the stream provider X would need to provide an intra-frame before the new receiver Z is able to start decoding the stream. This could be done either by the stream provider periodically X generating keyframes in the stream, or the stream provider X generating new intra-frames in the form of sync-frames based on requests. However, the former costs bit-rate since key-frames require a greater bit-rate, while the later costs a delay for signaling. By generating the required intra-frame at the intermediate first recipient Y on the other hand, e.g. in the form of a sync-frame, neither of these burdens need be incurred by the transmitting node X. Thus it is possible to transmit with a lower bit-rate over the channel from X to Y (where for example the loss-rate may be lower), but then to relay the stream onwards with a higher bitrate over the channel from Y to Z (where for example the loss-rate may be higher).

Figure 7C:
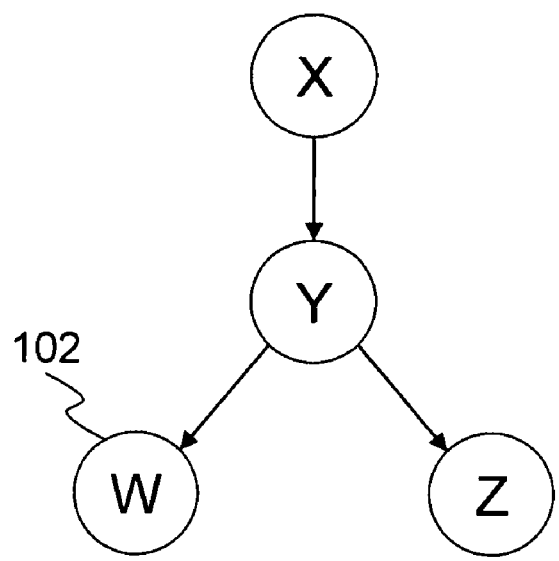

As shown schematically in FIG. 7c, the idea can be extended to a case where a further recipient node 102(W) establishes another one-to-one connection with the first, intermediate node Y; and the intermediate node Y acts as a multicasting relay node, relaying a modified version of the stream to both W and Z. In this case, preferably each of the second recipients W and Z may request their own respective sync-frames from the intermediate recipient Y, so that different sync-frames may be sent to each at different times in response to their separate respective requests.

Note that the intermediate recipient node Y may also be able to request sync-frames on demand from X, but those sync frames are not the same as those provided by Y to the second recipients W and Z. That is for example, if Y experiences a packet loss it may request a sync-frame generated by X to provide it with new intra-frame data to compensate for the lost packet in question; and if at a different time one of the second recipient nodes W and/or Z experiences a loss of a different packet or packets, then that second recipient node W or Z can request its own new sync frame from Y to compensate for the respective lost packet or packets. In this case, the sync frame provided onwards by the intermediate recipient Y was not included in the incoming stream from the transmitting node X to Y, but rather was generated at Y using the decoded data which Y decoded from the incoming stream of inter-frame data received from X.

Figure 7D:
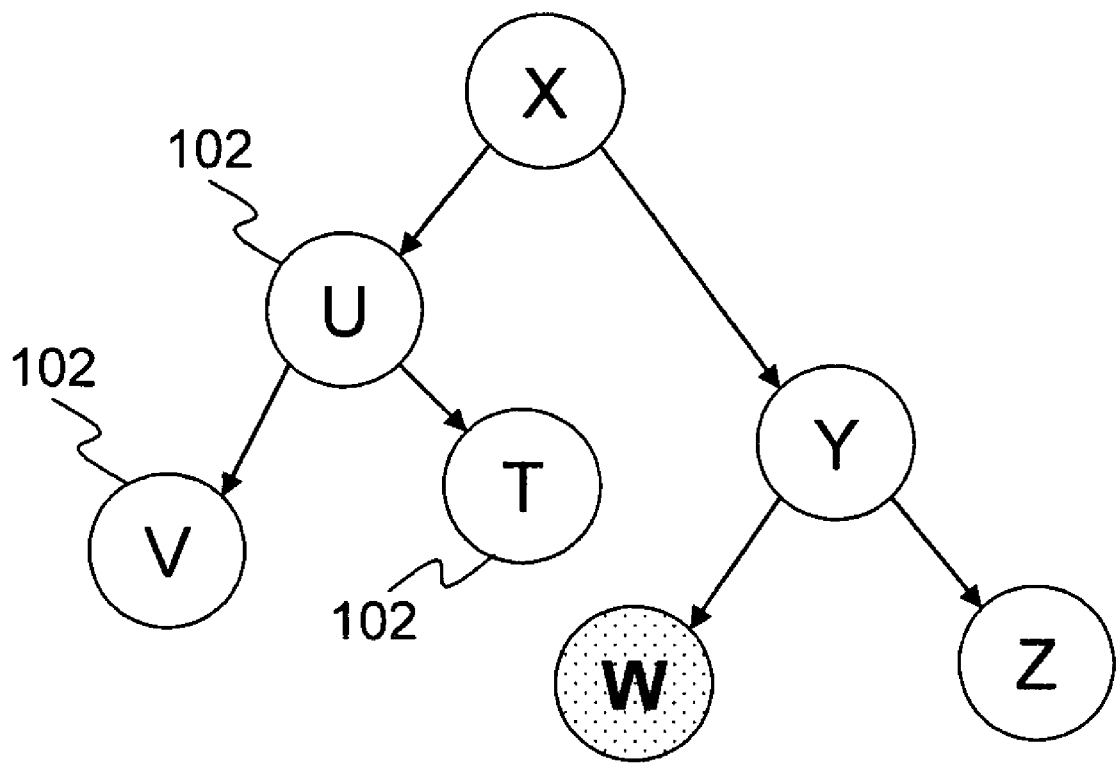

As shown schematically in FIG. 7d, the above principles can be used to create a larger array or "mesh" of nodes, e.g. of peers (end-user nodes) of a P2P system. In the example of FIG. 7d, a tree-type array is created whereby, in addition to the connections discussed above, another intermediate node 102(U) establishes another one-to-one connection with the transmitting node X over the network 108 (in parallel with the connection with Y), and begins to receive the stream. Subsequently, one or more further recipient nodes 102(V) and 102(T) may establish respective one-to-one connections with this new intermediate node U and also thus join the stream. E.g. this could be used to create a large video conference. When U joins the stream or experiences packet loss, it may request a sync frame from X; and when V or T joins the stream or experiences packet loss then it may request a respective sync frame generated by its corresponding intermediate node U. Similarly to Y, the further intermediate recipient U can generate sync frames using the decoded data which it decodes from the incoming stream of inter-frame data received from X—so the sync frames required by V or T do not need to be generated and routed all the way from the transmitting node X.

Alternatively or additionally to the generation of sync frames, other coding modifications to the relayed stream can be applied by the intermediate recipient nodes Y or U. For example, Y or U could transcode the stream, i.e. by taking the decoded stream as decoded at the intermediate node Y or U and re-encoding that stream using a different codec than used by the transmitting node X (different codec could mean using a completely different coding algorithm or using different parameters of the same coding algorithm). Thus for example if the channel from Y to Z was more lossy or could support a higher bandwidth, Y could re-encode the stream with a higher coding rate for relaying to Z than was used for transmission from X. This technique could be used for either audio and/or video streams.

More complicated arrays than shown in FIG. 7d could also be created, e.g. where two or more intermediate relaying recipient nodes each relay different portions of the same stream to one or more of the same second recipients.

Considering all of the above, the idea is thus that each routing peer (e.g. who is a participating member of the video conference) can act as a more intelligent routing node given actual knowledge of the video stream content. The routing peer is content aware (able to decode the stream), such that generation of sync-frames, transcoding and/or other stream modifications can be made possible at the intermediate node (i.e. the intermediate recipient).

In the example of FIG. 7d, W is the most recent member who joins the call. X is streaming video through a P2P distribution tree. When W joins the call, a key frame is needed before decoding the regular inter-frames is possible. Also, on burst packet loss, W may need to request a recovery frame, or another key-frame to recover the loss state. If Y is content aware, W can get intra-frames or recovery frames that are generated by Y. Transcoding at Y is one other possible approach. Using content aware peers, the loss recovery and intra-frame generation can be completely distributed to the P2P system.

As mentioned, the preferred way to provide additional intra-frame data is by generating what are termed herein "sync-frames", sent "on demand". A preferred technique for generating sync-frames is now described. By way of illustration, the idea will be described in relation to the intermediate recipient node Y generating sync frames for onward supply to two second recipient nodes W and Z, but it will be appreciated that a similar technique can be applied to generate sync frames at U for supply to V and T, or at X to generate sync frames for supply to Y and U, etc. In a particularly preferred application of the present invention, each of the nodes T . . . Z is an end-user terminal (e.g. rather than a specialised server, router or gateway), and most preferably (but not necessarily) is a peer of a P2P system.

Figure 2:
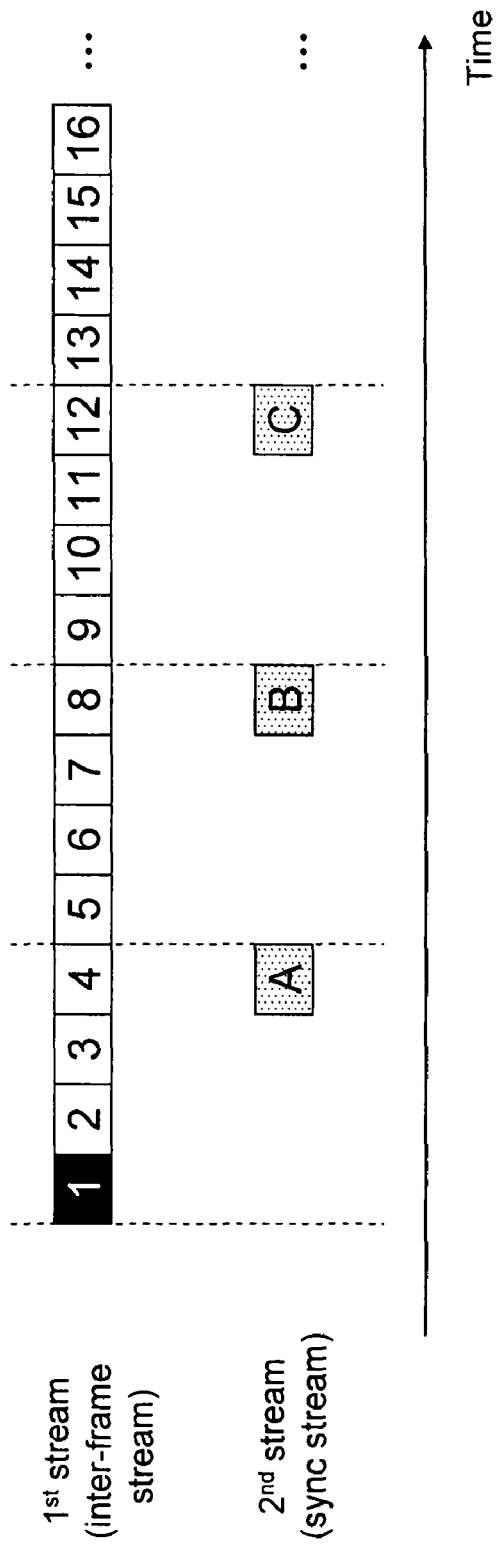
FIG. 2 is a schematic representation of a pair of streams comprising an inter-frame stream and a sync frame stream.

Two separate, parallel streams are generated at the transmitting terminal 102(X): a first stream and a second stream. As illustrated schematically in FIG. 2, the first stream comprises an initial key frame 1 (shown black), followed only by sequence of contiguous inter-frames 2-16, etc. (shown white) and no further key frames. The second stream may be referred to herein as the "sync stream", comprising a plurality of "sync-frames" A, B, C, etc. (shown dotted).

At the intermediate node 102(Y), only the second, sync stream need be generated, which is generated from the decoded data. As well as being decoded, the first stream may be relayed directly to the next recipients 102(W) and 102(Z).

Figure 1:
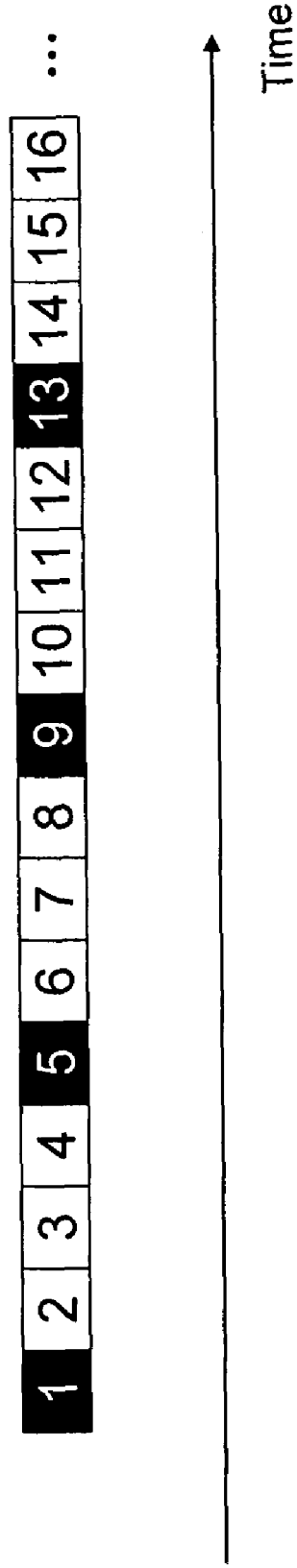
FIG. 1 is a schematic representation of a video stream comprising inter-frames and key frames.

The idea of the sync-frames is to decouple the dependency on the past frames without needing to interleave multiple key-frames into the first stream, as would have been required in previously as illustrated in FIG. 1.

As mentioned, and as will be familiar to a person of ordinary skill in the art, an inter-frame is encoded relative to a preceding frame and takes fewer bits to encode; whereas a intra-frame is encoded in an absolute manner, relative only to other data in the same frame representing the same moment in time, therefore requiring more bits to encode. That is to say, an inter-frame requires a preceding frame in order to decode, whilst an intra-frame is independently decodable.

Therefore the first stream requires an initial intra-frame 1—a key-frame—relative to which the subsequent inter-frames 2-16 and onwards are encoded, i.e. in order for those inter frames to be meaningfully defined. When the transmitting terminal X first begins relaying to the first recipient terminal Y, it begins the stream with the initial key-frame 1. However, following the initial key-frame 1, preferably no further key-frames are generated or transmitted as part of the first stream.

In principle, this would be sufficient for a recipient Y, W or Z to continue to decode the stream indefinitely, assuming perfect encoding and lossless channels. However, in reality errors will occur due to packet-loss or otherwise, in which case the meaning of inter-frames relative to previous frames becomes distorted, e.g. resulting in artifacts. This is why prior techniques as illustrated in FIG. 1 would have periodically interleaved intra-frames in the form of key-frames into the stream, so that at intervals the recipient could reset its decoding with a new, internally defined, independently decodable, absolute frame.

According to preferred embodiments of the present invention on the other hand, the intermediate recipient node Y instead only sends an intra frame onward to the next recipient W or Z on demand, in the form of a separate sync frame which is selectively transmitted from the generated sync stream as and when the intermediate recipient node Y receives a respective corresponding request signal from the second recipient W or Z. Similarly X only transmits a sync frame to Y when requested by Y; but note again that the sync frame sent from Y to W or Z is generated by the intermediate recipient Y using the decoded data, and is not directly received from X in encoded form in the incoming encoded stream. Use of key frames in the first, inter-frame stream is deliberately avoided except for the initial frame 1. The coding efficiency is therefore higher compared to the traditional approach of frequent key-frames.

Note that, due to the explicit dependency on past decoded frames, the first stream is only useful by itself if the whole stream is available since its start. If an additional new recipient terminal W connects to Y and joins the stream therefore, it must first request to receive both the first, inter-frame stream and the second, sync stream. Upon receiving the next sync-frame, the first video stream becomes decodable. The new recipient W then stops requesting the sync-frame stream. From this point on, the new recipient receives video through the first, inter-frame stream only, until an un-recoverable packet loss occurs. The new recipient W can then requests the sync-frame stream again from Y, and waits for a new sync-frame so that it can continue decoding the first, inter-frame video stream.

The second, sync-frame stream removes the dependency of the history. A sync-frame works similarly to a key-frame as it is required to be independently decodable. On a point of terminology therefore, note that the terms "sync-frame" and "key-frame" as used herein both refer to types of intra-frame. The difference is when and on what condition they transmitted: key-frames according to existing techniques are scheduled intra-frames, transmitted periodically and unconditionally; whilst sync-frames on the other hand are intra-frames available to be transmitted "on demand", as and when requested from Y by a recipient such as W or Z.

Further, according to preferred embodiments of the present invention, an additional requirement may be imposed on sync-frames. That is, the decoded image of each sync-frame is preferably required to be bit-wise exact to that of a respective one corresponding inter-frame. For instance, referring to FIG. 2, the decoded image from frame B must be exactly the same as the decoded frame 8 (when frames 1-7 are properly decoded). The sync-frame stream may generate sync-frames repeatedly. However, the sync stream needs to be transmitted only to the receivers who cannot decode the first video stream, e.g. due to packet loss or recent participation.

A sync-frame such as A, B, C, etc. may be said to be generated and/or transmitted in parallel to the inter-frame stream in the sense that—instead of being interleaved in place of a corresponding inter frame such as 4, 8, 12, etc. relating to a corresponding time in the video—it is generated and/or transmitted in addition to a corresponding inter frame representing the same image at corresponding time in the video.

Separation of the video into the first stream and second sync stream allows more flexible ways of distributing video. For instance, still referring to FIG. 2, following sequences of video frames are decodable:

(i) A-1-2-3-4-5-6-7-8-9-10-11-12-13-14-15-16,
(ii) B-5-6-7-8-9-10-11-12-13-14-15-16,
(iii) C-9-10-11-12-13-14-15-16,
(iv) D-13-14-15-16,
(v) A-1-2-3-4-packet loss-C-9-10-11-12-13-14-15-16, etc.

This is particularly useful in video streaming to multiple recipients, where packet loss may occur independently for each different receiver. One main advantage of this scheme is in a multi receiver video conferencing or streaming application, so that periodic transmission of key-frames to all receivers can be avoided. The removal of key-frames reduces bit-rate without affecting the decoding quality. The key-frames are transmitting only to receivers who actively request them. Overall, this leads to more efficient utilization of bandwidth An example implementation is now discussed in relation to FIGS. 3 and 4.

Figure 3:
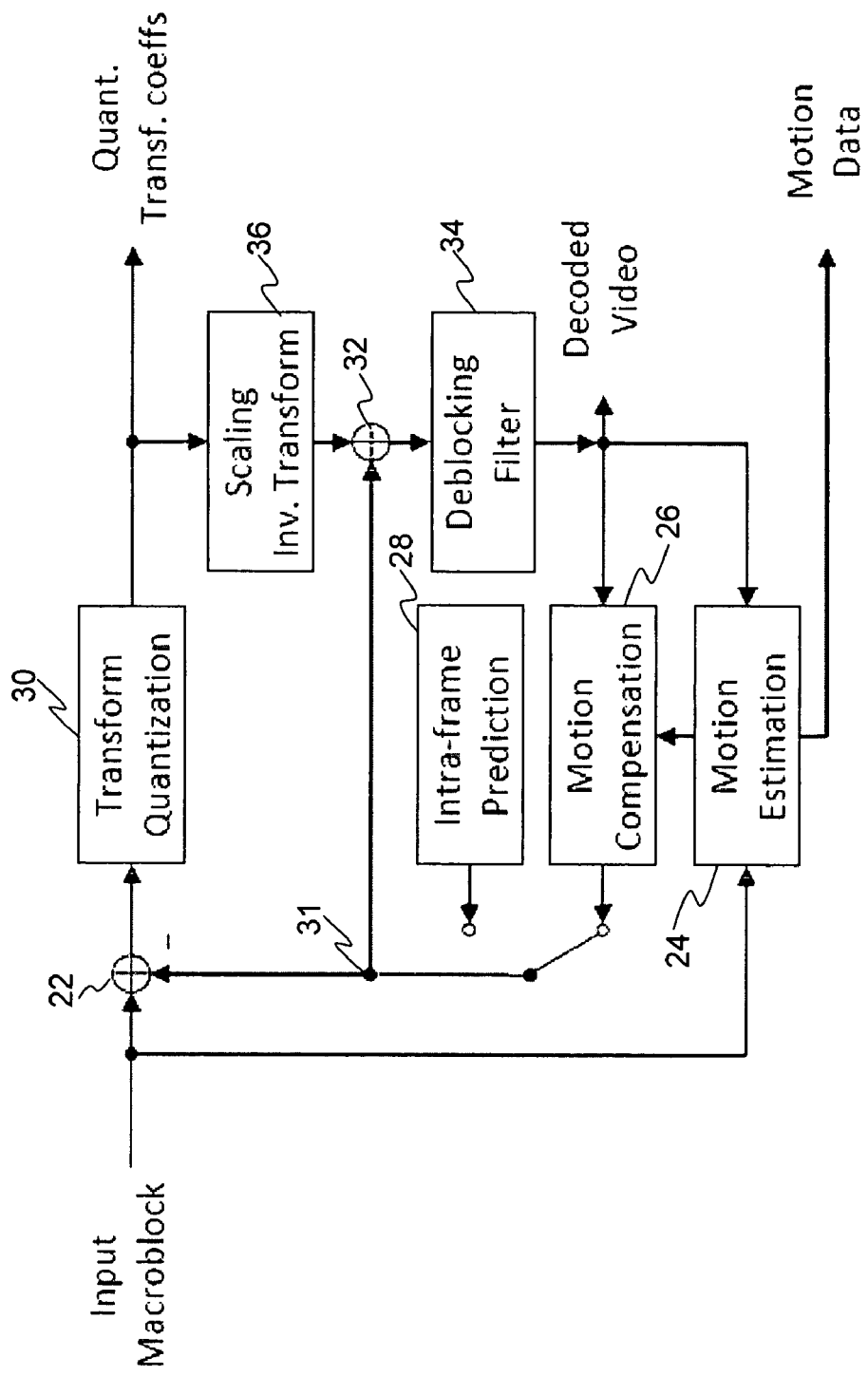
FIG. 3 is a schematic block diagram of a video encoder for outputting a stream as shown in FIG. 1.

A standard video codec for encoding a conventional stream of inter-frames and interleaved key-frames, as in FIG. 1, is first described in relation to FIG. 3. This shows the basic coding structure of H.264/AVC as cited above. This outputs quantized transformation coefficients and motion data which can then be transmitted to the decoder.

The video encoder of FIG. 3 comprises a first subtraction stage 22, a motion estimation module 24, a motion compensation module 26, an intra-frame prediction module 28, a first transformation quantization module 30, a first addition stage 32, a first deblocking filter module 34, a first scaling inverse transform module 36, and a switch node 31. Each of these components would preferably be implemented in software stored on a memory of the transmitting terminal 102(X) and executed on a processor of that terminal, but the option is not excluded of some or all of these components being in part or in whole implemented in dedicated hardware.

The first subtraction stage 22 is arranged to receive an input signal comprising a series of input macroblocks each corresponding to a portion of a frame. The motion estimation module 24 also has an input arranged to receive the same series of macroblocks. The other input of the first subtraction stage 22 is coupled to the switch node 31, which is switchably coupleable between the output of either of the intra-frame prediction module 28 and the motion compensation module 26 at any one time. The output of the first subtraction stage is coupled to the input of the firsts transform quantization module 30, whose output is arranged to supply quantized transform coefficients as part of the encoded video signal for transmission to the one or more recipient terminals 102(Y), 102(U) etc. The output of the first transform quantization module 30 is also fed back, being coupled to the input of the first scaling inverse transform module 36. The output of the first scaling inverse transform module 39 is coupled to an input of the first addition stage 32. The other input of the first addition stage 32 is coupled to the switch node 31, so as to be switchably coupled to the output of the motion compensation module 26 whenever the first subtraction stage 22 is also. The output of the first addition stage 32 is coupled to the input of the first deblocking filter 34. The output of the first deblocking filter 34 is arranged to supply motion estimation as part of the encoded video signal for transmission to the one or more recipient terminals 102(Y), 102(U) etc. The output of the first deblocking filter 34 is also fed back, being coupled to an input of each of the motion estimation module 24 and the motion compensation module 36.

In operation, the first subtraction stage 22 produces a difference signal representing the difference between the input signal and the output of either the intra-frame prediction module 28 (when performing intra-frame encoding data) or the motion compensation module 26 (when performing inter-frame data). The first transform quantization block 30 quantizes this difference signal, thus generating quantized transform coefficients for output in the encoded video signal for transmission to a recipient terminal 102(Y), 102(U), etc.

The key-frames are generated by intra-frame encoding, which is a form of static image compression within a frame. When performing intra-frame encoding, the idea is to only encode and transmit a measure of how a portion of image data within a frame differs from another portion within that same frame, the prediction being based on a correlation between the portions. The same prediction process can be done at the decoder (given some absolute data), and so it is only necessary to transmit the difference between the prediction and the actual data, rather than the actual data itself. The difference signal is typically smaller in magnitude, so takes fewer bits to encode.

In the case of inter-frames, the motion compensation module 26 is switched in in place of the intra-frame prediction module 28, and a feed back loop is thus created between blocks of one frame and another, in order to encode the inter-frame relative to those of a preceding frame. This takes even fewer bits to encode than an intra-frame.

For inter-frame encoding, the coefficients output by the first transform quantization module are fed back to the first scaling inverse transform module 36, which turns the coefficients back into a version of the difference signal but including the effect of having been quantized. The output of the motion compensation module 26 is added back onto the output of the first scaling inverse transform module 36 at the first addition stage 36, and the result is passed through the first deblocking filter 34. A deblocking filter is used to mitigate the effect of blocking within a frame by smoothing the abrupt edges which can form between blocks.

The overall effect of the first scaling inverse transform block 36, first addition stage 32 and first deblocking filter 34 is to recreate a decoded video signal as it would appear when decoded at the recipient terminal 102(Y) or 102(U), etc.

This decoded video signal is the supplied to inputs of the motion compensation module 26 and motion estimation module 24. The motion estimation module 26 also receives the input signal. It then performs a motion estimation using the two, by generating motion vectors that represent a transformation due to movement between the previous frame of the decoded video signal and the current frame of the input signal. The motion vectors are supplied to the motion compensation module 26, and also output as part of the encoded video signal for transmission to a recipient terminal 102(Y) or 102(U), etc.

The motion compensation module 26 then works by applying the motion vectors to the current frame to try to predict the transformation to the next frame. This is used to produce the difference signal, which in the case of inter-frame encoding represents how the predicted inter-frame deviates the actual inter-frame data. The first transform quantization module 30 quantizes this difference for output as part of the encoded video signal along with the motion estimation vectors, and the decoder at the recipient terminal can then decode the inter-frame using the same motion estimation process along with the decoded deviation from this motion-based prediction.

Figure 4:
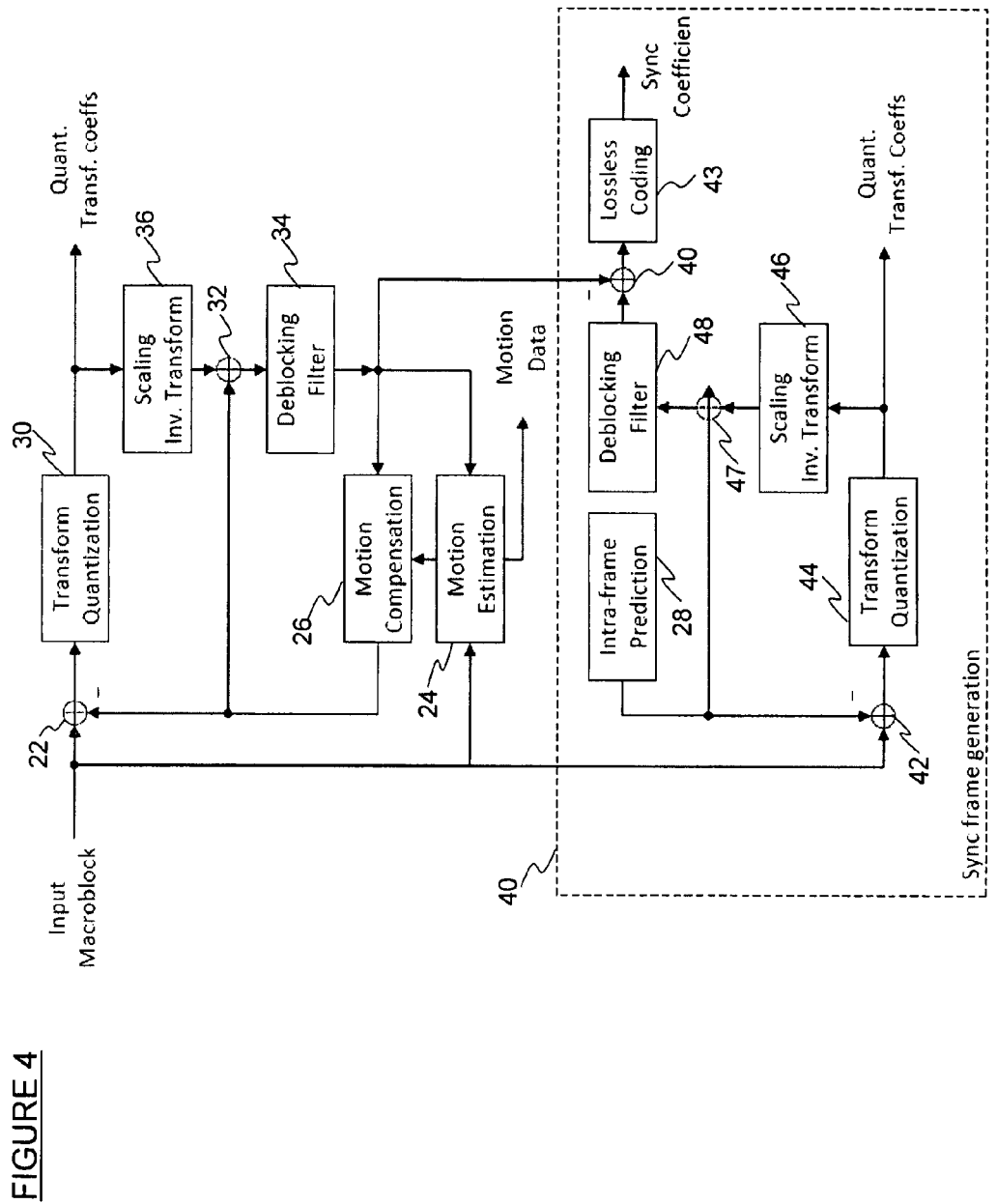
FIG. 4 is a schematic block diagram of an improved video encoder for outputting a stream as shown in FIG. 2.

An extension to the encoder for generating sync-frames according to embodiments of the present invention is shown in FIG. 4, for implementation at the transmitting terminal 102(X), and again at the intermediate recipient terminal 102(Y) which as discussed is both a recipient consumer of the stream and also a relay of the stream. The sync-frame can be generated using regular key-frame type intra-frame prediction encoding, plus additionally computing the difference between the decoded key-frame type frame and the corresponding inter-frame. The difference is coded losslessly using an entropy code, and the outcome may be referred to herein as the sync coefficients. The quantized transformation coefficients and the sync coefficients together form the encoded sync-frame to be transmitted to the decoder. When decoded using both these sets of coefficients, the decoded sync-frame will be bitwise exact to the corresponding inter-frame.

The top-half of the diagram is substantially the same as FIG. 3, but without the intra-frame prediction module 28 being switchably coupled to the first subtraction stage 22. Instead, the output of the motion compensation module remains continually coupled to the first subtraction stage 22 and the first addition stage 32 (except perhaps for the initial key-frame 1). This part of the system thus generates the first, inter-frame stream.

A sync-frame generator 40 is then provided for generating the separate, second sync-frame stream A, B, C, etc. The sync-frame generator comprises the intra-frame prediction module 28, a second deblocking filter 48, a second subtraction stage 40, a lossless coding module 43, a third subtraction stage 42, a second transform quantization module 44, a second scaling inverse transform module 46 and a second addition stage 47.

Each of these components is preferably implemented in software stored on a memory of each of the transmitting terminals 102(X) and the intermediate recipient terminal 102(Y) and executed on a processor of each of those terminals, but the option is not excluded of some or all of these components being in part or in whole implemented in dedicated hardware.

An input of the third subtraction stage 42 is arranged to receive the input signal comprising the series of input macroblocks. The other input of the third subtraction stage 42 is coupled to the output of the intra-frame prediction module 28. The output of the third subtraction stage 42 is coupled to the input of the second transform quantization module 44, the output of which is arranged to supply quantized transform coefficients as part of the encoded video signal for transmission from the transmitting terminal 102(X) to a first recipient terminal 102(Y) or 102(U), although the intermediate nodes 102(Y) and 102(U) need not necessarily output these coefficients onwards to the next recipients 102(T, V, W, Z) if the first, inter-frame stream is instead relayed directly to those terminals. In either case, the output of the second transform quantization module 44 is also coupled to the input of the second scaling inverse transform module 46. The output of the second scaling inverse transform module 46 is coupled to the input of the second addition stage 47, and the other input of the second addition stage is coupled to the output of the intra-frame prediction module 28. The output of the second addition stage 47 is coupled to the input of the second deblocking filter 48, and the output of the second deblocking filter 48 is coupled to an input of the second subtraction stage 40. The other input of the second subtraction stage 40 is coupled to the output of the first deblocking filter 34. The output of the second subtraction stage 40 is coupled to the input of the lossless coding module 43. The output of the lossless coding module 43 is arranged to supply sync coefficients as part of the encoded video signal for transmission on demand from the intermediate recipient terminal 102(Y) to the one or more second recipient terminals 102(W) or 102(Z), or from the transmitting terminal 102(X) to one of the first recipient terminals 102(Y) or 102(U).

In operation, the third subtraction stage 42, second transform quantization module 44 and intra-frame prediction module 28 produce quantized transform coefficients as part of the encoded video signal for transmission from the transmitting terminal 102(X) to the first recipient terminal 102(Y) or 102(U), in a similar manner to the intra-frame prediction process described above, although the intermediate nodes 102(Y) and 102(U) need not necessarily output these coefficients onwards to the next recipients 102(T, V, W, Z) if the first, inter-frame stream is instead relayed directly to those terminals.

In either case, the quantized transform coefficients are also supplied to the input of the second scaling inverse transform module 46. Similarly to the effect of the first scaling inverse transform block 36, first addition stage 32 and first deblocking filter 34; the overall effect of the second scaling inverse transform block 46, second addition stage 37 and second deblocking filter 48 is to recreate a decoded video signal as it would appear when decoded at a recipient terminal (if only intra-frame prediction coding was used).

The second subtraction stage 40 then determines the difference between this decoded video signal comprising only the intra-frame prediction coded data and the decoded video signal of a corresponding one of the inter-frames as output from the first deblocking filter 34. The difference between the intra-frame prediction decoded frame and corresponding inter-frame is then losslessly encoded by the lossless encoding module 43. Lossless encoding means directly representing the image data of the frame, in a manner allowing exact reproduction at the decoder.

By transmitting these losslessly encoded sync coefficients along with the quantized transform coefficients, this means the sync-frame decoded using both sets of coefficients will be bit-wise exact to the corresponding one of the inter-frames.

Thus sync frames are generated at the transmitting terminal 102(X), and are also separately generated at the intermediate terminal 102(Y) using the decoded data decoded from the incoming stream from X. The sync frames generated at X are made available on demand to the first recipient Y, and the sync frames separately generated at Y are made available on demand to the second recipients W and Z.

Figure 6:
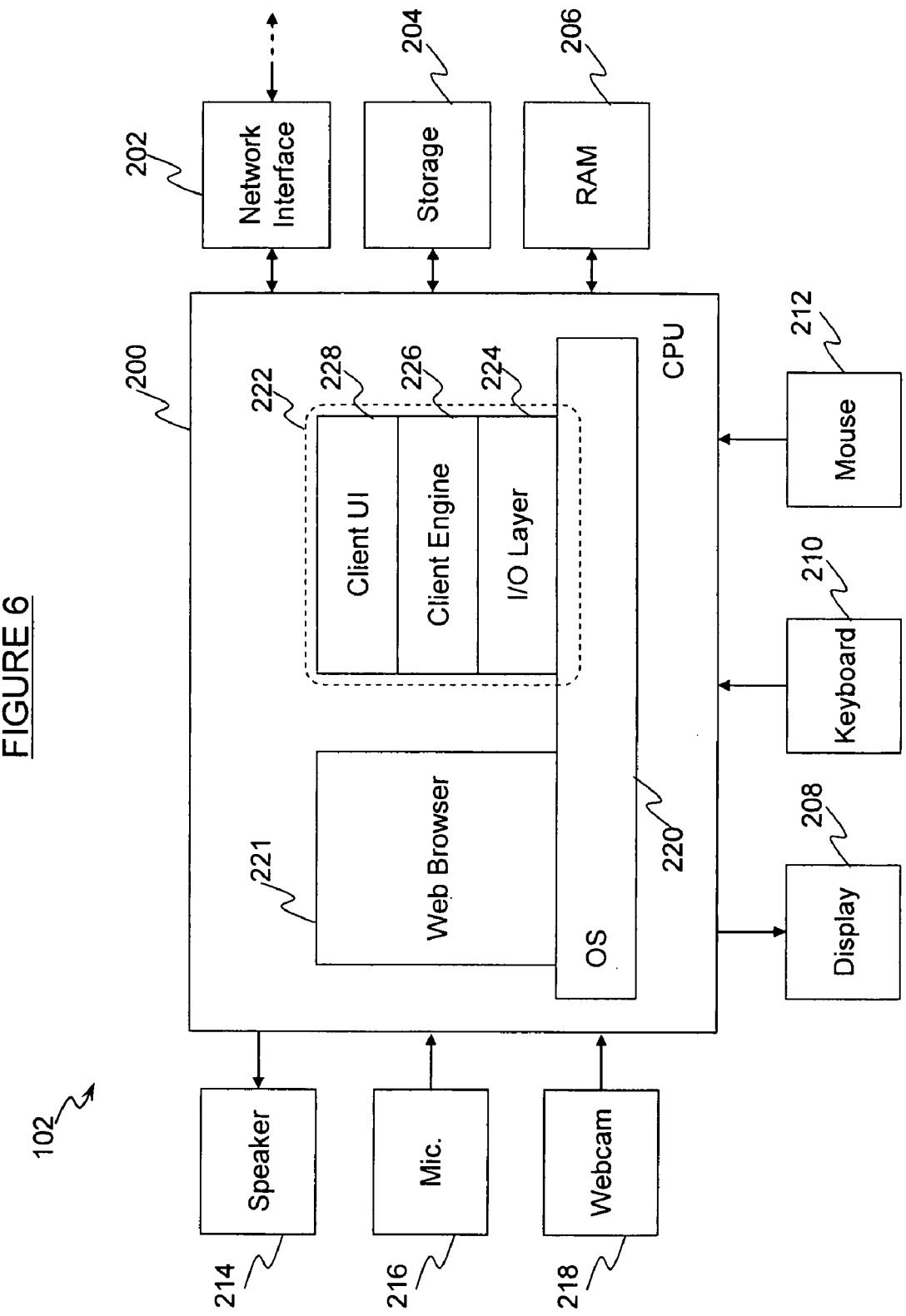
FIG. 6 is a schematic block diagram of a user terminal installed with a P2P client application.

An example application of the present invention is now described in relation to FIGS. 5 and 6.

FIG. 5 is a schematic illustration of a packet-based network such as the Internet, which comprises a plurality of interconnected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(T) to 102(Z) such as desktop or laptop PCs or Internet-enabled mobile phones; one or more servers 104 of a communication system; one or more web servers 105; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Packet-based networks such as the Internet can be used to implement a number of different types of communication between end-users, such as voice-over-IP calls, video-over-IP calls, instant messaging (IM) chat sessions, and file transfer. To achieve this, each of a plurality of end-users installs and executes a client application on their respective terminal 102. The client applications together with any required functionality of server 104 form a communication system running over the Internet. Further, by communicating via a gateway to a telephone network (not shown), the system may also allow communication with other types of network such as a PSTN network in order to call a conventional fixed land-line or a mobile cellular network in order to call a mobile phone.

For example, voice or video-over-IP (VoIP) calls are beneficial to end-users because they are typically of significantly lower cost than fixed line or cellular mobile calls, often even free when from one VoIP client to another (rather than via a gateway to a telephone network). The cost savings may be particularly significant in the case of international or long-distance calls, because when communicating over the Internet using IP then the cost need not be dependent on distance.

In order to communicate with another client, the initiating client needs to know the IP address of the terminal 102 on which the other client is installed. Therefore a process of address look-up is required.

Some Internet-based communication systems are managed by an operator, in that they rely on one or more centralized, operator-run servers 104 for address look-up. In that case, when one client is to communicate with another, then the initiating client must contact a centralized server run by the system operator to obtain the callee's IP address.

In contrast to these operator managed systems, another type of Internet-based communication system is known as a "peer-to-peer" (P2P) system. The idea behind peer-to-peer (P2P) systems is to devolve responsibility away from centralized operator servers and into the end-users' own terminals. In the least, this means responsibility for address look-up is devolved to end-user terminals like those labelled 102(T) to 102(Z) in FIG. 1. Each user terminal 102 runs a P2P client application, and each such terminal forms a node of the P2P system. P2P address look-up works by distributing a database of IP addresses amongst a subgroup of the end-user nodes. The database is a list which maps the usernames of all online or recently online users to the relevant IP addresses, such that the IP address can be determined given the username.

Each node hosting a portion of the database acts as an IP address look-up point for a group of other nearby nodes, and its respective list contains the usernames and IP addresses of the nodes in that subgroup. The subgroup need not necessarily be "nearby" in terms of geographical location, but rather in terms of how directly connected the nodes are to one another (which may be related to geographical location). Thus, instead of contacting a centralized server, the client on a calling node will contact another end-user node in order to look up the IP address of the callee node. Referring to FIG. 1 for example, the client on one user node 102(Z) may look up the IP address of another user node 102(Y) from a further user node 102(V) which happens to hosting part of the list. If the contacted node 102(V) does not have the required IP address in its list because its respective subgroup does not include the callee node, then the calling node 102(Z) or contacted node 102(V) may contact one or more other node hosting parts of the list to find one whose subgroup does include the callee node and thus determine the required address. In this way, the list mapping usernames to IP addresses is distributed amongst end-user nodes and no server is required for address look-up.

There may also be a P2P client application installed at one or more gateways 106 coupled to both the Internet 108 and one or more other networks 109 such as a PSTN network and/or a mobile cellular network. This allows the P2P client applications running on end-user terminals 102 to communicate with ordinary land-line telephones and/or mobile telephones respectively, even if those telephones themselves do not run P2P client applications and are not directly coupled to the Internet. In that case, the P2P client application on the terminal 102 sets up a connection over the Internet with the P2P client application on the gateway 106 using P2P call set-up and provides it with a phone number, and the gateway 106 uses the phone number to set up a connection with the telephone over the respective other network. Or in the other direction, a telephone user may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile cellular network.

In addition to address look-up, a supplier of the P2P client application may choose to provide some additional, secondary features which in contrast to address look-up may involve a server 104. One such function is the distribution of authentication certificates which are supplied from the server 104 to the user terminals 102 when they first register with the P2P system. After initial registration, the users' clients can then exchange the certificates in order to authenticate each other without further involvement of a server. The P2P server 104 may also be used to provide some other secondary features in relation to a P2P network, such as to host contact lists and/or "avatar" images (images chosen by the users to represent themselves graphically to others of the P2P network). Nonetheless, the primary function of address look-up is still handled in a distributed fashion by end-user nodes, not by a server.

More details of address look-up in an exemplary P2P system can be found in WO 2005/009019.

VoIP or other packet-based communications can also be implemented using non-P2P systems that do use centralized call set-up and/or authentication, e.g. via a server or cellular network.

Each of the end-user terminals 102 may also be installed with other Internet-related software such as a web browser which, when executed, allows the user terminal 102 to retrieve information in the form of web pages and associated data from web servers 105 coupled to the Internet 108. This could include streaming video from a web server 105 accessed via a web page.

The schematic block diagram of FIG. 6 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. The storage device may also store other Internet-related software such as a web-browser 221. On start-up or reset of the terminal 102, the operating system software 220 is automatically loaded into the RAM 206 and from there is run by being executed on the CPU 200. Once running, the operating system 220 can then run applications such as the web client application 221 and P2P client application 222 by loading them into the into the RAM 206 and executing them on the CPU 200. To represent this schematically in FIG. 2, the operating system 220, web client application 221 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 6. The web client application 221 and P2P client application 222 are said to be run "on" the operating system 220. This means that in a multitasking environment they are scheduled for execution by the operating system 220; and further that inputs to the web client application 221 and the lowest (I/O) layer 224 of the P2P client application 222 from the input devices 202, 216 and 218 as well as outputs from web client application 221 and the I/O layer 224 of the P2P client application 222 to the output devices 202, 208 and 214 may be mediated via suitable drivers and/or APIs of the operating system 220.

The I/O layer 224 of the P2P client application comprises audio and video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signaling protocol for signaling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users in the contact list by periodically polling them via a public API, and reciprocally provide its own presence information when polled by those other clients that are online. Exchange of presence information directly between clients via a public API is the preferred option, but alternatively the presence information could be exchanged via an intermediate node such as a server 104. The presence of a user is preferably defined in part by that users themselves.

The UI layer 228 is responsible for presenting decoded video to the user via the display 208, for presenting the output on the display 208 along with other information such as presence and profile information and user controls such as buttons and menus, and for receiving inputs from the user via the presented controls.

It will be appreciated that the above embodiments have been described only by way of example.

For instance, the modification applied at the first, intermediate, relaying recipient node is not limited to the inclusion of on-demand sync-frames along with the stream. Alternatively or additionally, the modification could comprise generating and including other intra frame data such as periodic keyframes along with the stream, and/or the modification could comprise a transcoding to a different codec (either using different coding algorithm altogether or using different parameters of the same coding algorithm).

Other options for triggering request of a sync-frame by the recipient terminal may be used, e.g. one other possibility would be to request a sync frame if a user clicks or selects a control to report bad quality or artifacts.

In the embodiments described above, the encoder always generates the sync stream but only transmits the sync frames on demand as and when needed. However, in alternative embodiments the encoder could actually generate the sync frames on demand.

The sync-frames described above preferably encoded losslessly by using the sync coefficients to encode the difference between a corresponding inter-frame the sync-frame's intra-frame prediction data, but in other embodiments could instead transmit an intra-frame without this additional encoding. In less preferred embodiments, the sync-frames or such like need not necessarily be lossless or bitwise-exact to a corresponding inter-frame. Some degree of difference may be permissible, especially perhaps for short videos where propagation of errors through the video may be less of a problem.

Where it is referred to a frame, intra-frame, sync-frame, inter-frame or such like, this may refer to an image of the whole height and width of the video, but this is not necessarily the case and more generally the terms could refer to any image portion.

By inter-frame and intra-frame encoding or such like this does not necessarily mean encoded according to any specific standard. More generally, inter-frame encoding or such like means encoded relative to other image data from a preceding time, and could relate to encoding any portion of a video image from one time to a next. Intra-frame encoding could refer to any coding between portions of image data representing substantially the same moment or interval in time, using intra-frame prediction or otherwise; or indeed any alternative encoding suitable for mitigating the effect of missed or insufficient inter-frame data could be used in the role of the sync frames discussed above.

Where it is said the stream is "live" or in "real-time", this does not necessarily mean it is being viewed live or transmitted or received with the exact timing of real-life events, but more generally that some kind of "on the fly" decision or operation regarding decoding is being made at the recipient terminal as the stream arrives (as opposed to transmitting and receiving a whole encoded file then only decoding later after the whole file has been received). E.g. the stream could actually be being stored at the receiving terminal rather than being viewed live, but the invention is still applicable if the receiving terminal is performing some degree of decoding or analysis relating to decoding as the stream arrives such that it can request a sync frame where needed. That is to say, the request for the sync-frame or such like is received from the recipient during ongoing transmission of the stream—after starting transmission of the inter-frame stream but before finishing transmission. Note also that "ongoing transmission" in this sense does not mean there is no absolutely break in the data (indeed in the case of packet-loss there is a break in the received data at least), but rather during substantively ongoing transmission of the same video content.

As discussed, the present invention preferably transmits video without the periodic transmission of intra-frame encoded video data, and preferably without any extra intra-frame encoded data apart from the initial key-frame and that which is transmitted on request of the recipient. However, in embodiments this could mean only substantially without periodic or extra transmission of intra frame encoded data, in the sense that inclusion of a negligible amount of intra-frame encoded data does not extend beyond the principle of the invention. E.g. inclusion of periodic intra frame data that was too infrequent to be useful in avoiding errors would not be substantially periodic.

The decoded video could be output to any output device at the receiver, e.g. by being played via a video screen, or stored in a memory device, or relayed to another recipient.

The above has been described in relation to a peer-to-peer system, but in other implementations then other types of communication system could be used, e.g. which do use centralised call set-up and/or authentication via a server. Further, the transmitting node X (the provider of the stream) need not necessarily be an end-user, but could alternatively be a server such as a web-server 105, or a gateway 106 relaying communications from another network such as a PSTN or mobile cellular network.

Other applications and configurations of the present invention may be apparent to a person skilled in the art given the disclosure herein. The present invention is not limited by the described embodiments, but only by the appended claims.

What is claimed is:

1. A method of delivering an encoded data stream to a plurality of recipient end-user nodes of a network, the method comprising:
   receiving an incoming encoded data stream at a first recipient node from a transmitting node over the network;
   during ongoing receipt of the incoming encoded data stream at the first recipient node from the transmitting node, decoding the incoming encoded data stream at the first recipient node to produce a decoded data stream and outputting the decoded data stream for consumption at the first recipient node;
   at the first recipient node, using the decoded data stream to generate a modified encoded data stream being a modified version of the incoming encoded data stream; and
   still during ongoing receipt of the incoming encoded data stream at the first recipient node from the transmitting node, relaying the modified encoded data stream from the first recipient node to one or more second recipient nodes over the network;
   wherein the modified encoded data stream is generated at the first recipient node by generating additional encoded data based on the decoded data stream and associating the additional encoded data with encoded data of the incoming encoded data stream, the additional encoded data not having been included in encoded form in the incoming encoded data stream as received at the first recipient node from the transmitting node;
   the incoming encoded data stream comprises an encoded video stream comprising a stream of inter frame encoded video data said output of the stream for consumption comprises playing the video stream at the first recipient node; and the additional encoded data comprises intra frame encoded video data;
   the stream of inter frame encoded video data is relayed to the second recipient node without periodic inclusion of intra frame encoded video data in the modified encoded data stream.

2. The method of claim 1, wherein the modified encoded data stream has a higher coding rate than the incoming encoded data stream.

3. The method of claim 1, wherein the method comprises:
   relaying an un-modified encoded data stream, being an un-modified version of the incoming encoded data stream, from the first recipient node to the second recipient node over the network; and
   receiving a request signal at the first recipient node from the second recipient node;
   wherein said relaying of the modified encoded data stream is performed in response to the request signal from the second recipient node.

4. The method of claim 1, wherein said relaying of the modified encoded data stream comprises relaying the modified encoded data stream from the first recipient node to a plurality of second recipient nodes over the network.

5. The method of claim 3, wherein:
   said relaying of the modified encoded data stream comprises relaying the modified encoded data stream from the first recipient node to a plurality of second recipient nodes over the network said relaying of the un-modified encoded data stream comprises relaying the un-modified encoded data stream from the first recipient node to a plurality of second recipient nodes over the network;

the method comprises receiving a respective request signal at the first recipient node from each of said second recipient nodes; and said relaying of the modified encoded data stream to each of the plurality of second recipient nodes is performed in response to the respective request signal from each of those second recipient node.

6. The method of claim 3, wherein said relaying of the modified encoded data stream to each of the one or more second recipient nodes is performed only in response to the respective request signal.

7. The method of claim 3, wherein the request signal indicates that the respective second recipient node has failed to receive a portion of the un-modified encoded data stream.

8. The method of claim 1, wherein the modified encoded data stream is generated at the first recipient node by re-encoding the decoded data stream according to a different codec than used in the incoming encoded data stream.

9. The method of claim 1, wherein the network is a packet-based communication network.

10. The method according to claim 9, wherein the packet-based communication network comprises the internet.

11. The method of claim 1, wherein the transmitting node is an end-user node.

12. The method according to claim 11, comprising establishing a connection between the transmitting node and the first recipient node over said network using a peer-to-peer communication system, wherein the encoded data stream is transmitted to the intermediate node over said peer-to-peer established connection.

13. The method of claim 12, wherein the method comprises establishing a connection between the first recipient node and the second recipient node over said packet-based communication network using a peer-to-peer communication system, wherein the modified version of the encoded data stream is transmitted from the first recipient node over said peer-to-peer established connection.

14. A client application comprising code embodied on a non-transitory computer-readable medium and being configured so as when executed on a first recipient end-user node:
to receive an incoming encoded data stream at the first recipient node from a transmitting node over a network;
during ongoing receipt of the incoming encoded data stream at the first recipient node from the transmitting node, to decode the incoming encoded data stream at the first recipient node to produce a decoded data stream and to output the decoded data stream for consumption at the first recipient node;
to use the decoded data stream to generate a modified encoded data stream being a modified version of the incoming encoded data stream; and
still during ongoing receipt of the incoming encoded data stream at the first recipient node from the transmitting node, to relay the modified encoded data stream from the first recipient node to one or more second recipient nodes over the network;
wherein the modified encoded data stream is generated at the first recipient node by generating additional encoded data based on the decoded data stream and associating the additional encoded data with encoded data of the incoming encoded data stream, the additional encoded data not having been included in encoded form in the incoming encoded data stream as received at the first recipient node from the transmitting node;
the incoming encoded data stream comprises an encoded video stream comprising a stream of inter frame encoded video data said output of the stream for consumption comprises playing the video stream at the first recipient node; and the additional encoded data comprises intra frame encoded video data;
the stream of inter frame encoded video data is relayed to the second recipient node without periodic inclusion of intra frame encoded video data in the modified encoded data stream.

15. A first recipient end-user node comprising:
a receiver arranged to receive an incoming encoded data stream at the first recipient node from a transmitting node over a network;
processing apparatus configured, during ongoing receipt of the incoming encoded data stream at the first recipient node from the transmitting node, to decode the incoming encoded data stream at the first recipient node to produce a decoded data stream, to output the decoded data stream for consumption at the first recipient node, and to use the decoded data stream to generate a modified encoded data stream being a modified version of the incoming encoded data stream; and
a transmitter arranged, still during ongoing receipt of the incoming encoded data stream at the first recipient node from the transmitting node, to relay the modified encoded data stream from the first recipient node to one or more second recipient nodes over the network;
wherein the processing apparatus is configured to generate the modified encoded data stream by generating additional encoded data based on the decoded data stream and associating the additional encoded data with encoded data of the incoming encoded data stream, the additional encoded data not having been included in encoded form in the incoming encoded data stream as received at the first recipient node from the transmitting node;
the incoming encoded data stream comprises a stream of inter frame encoded video data, and the additional encoded data comprises intra frame encoded video data;
the transmitter is arranged to transmit the stream of inter frame encoded video data to the second recipient node without periodic inclusion of intra frame encoded video data in the modified encoded data stream.

16. The first recipient node of claim 15, wherein the processing apparatus is configured to generate the modified encoded data stream with a higher coding rate than the incoming encoded data stream.

17. The first recipient node of claim 16, wherein:
the transmitter is arranged to relay an un-modified encoded data stream, being an un-modified version of the incoming encoded data stream, from the first recipient node to the second recipient node over the network; and
the receiver is arranged to receive a request signal at the first recipient node from the second recipient node;
the processing apparatus is configured to initiate said relaying of the modified encoded data stream in response to the request signal from the second recipient node.

18. The first recipient node of claim 15, wherein the transmitter is arranged to relay the modified encoded data stream from the first recipient node to a plurality of second recipient nodes over the network.

19. The first recipient node of claims 17, wherein:
the transmitter is arranged to relay the modified encoded data stream from the first recipient node to a plurality of second recipient nodes over the network;
the transmitter is arranged to relay the un-modified encoded data stream from the first recipient node to a plurality of second recipient nodes over the network;
the receiver is arranged to receive a respective request signal at the first recipient node from each of said second recipient nodes; and
the processing apparatus is configured to initiate said relaying of the modified encoded data stream to each of the plurality of second recipient nodes in response to the respective request signal from each of those second recipient node.

20. The first recipient node of claim 17, wherein the processing apparatus is configured to initiate said relaying of the modified encoded data stream to each of the one or more second recipient nodes only in response to the respective request signal.

21. The first recipient node of claim 15, wherein the received request signal indicates that the respective second recipient node has failed to receive a portion of the un-modified encoded data stream.

22. The first recipient node of claim 15, wherein the incoming encoded data stream comprises an encoded video stream, and the processing apparatus is configured to output the stream for consumption by playing the video stream at the first recipient node.

23. The first recipient node of claim 15, wherein the processing apparatus is configured to generated the modified encoded data stream by re-encoding the decoded data stream according to a different codec than used in the incoming encoded data stream.

24. The first recipient node of claim 15, wherein the network is a packet-based communication network.

25. The first recipient node of claim 24, wherein the packet-based communication network comprises the internet.

26. The first recipient node of claim 15, wherein the transmitting node is an end-user node.

27. The first recipient node of claim 26, wherein the processing apparatus is configured to establish a connection between the transmitting node and the receiver of the first recipient node over said network using a peer-to-peer communication system, wherein the encoded data stream is transmitted to the intermediate node over said peer-to-peer established connection.

28. The first recipient node of claim 27, wherein the processing apparatus is configured to establish a connection between the transmitter of the first recipient node and the second recipient node over said packet-based communication network using a peer-to-peer communication system, and the transmitter is arranged to transmit the modified version of the encoded data stream from the first recipient node over said peer-to-peer established connection.

\* \* \* \* \*